United States Patent
Azima et al.

(10) Patent No.: US 6,307,942 B1
(45) Date of Patent: *Oct. 23, 2001

(54) PANEL-FORM MICROPHONES

(75) Inventors: Henry Azima, Cambridge; Martin Colloms, London; Neil John Harris, Cambridge, all of (GB)

(73) Assignee: New Transducers Limited, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/011,772
(22) PCT Filed: Sep. 2, 1996
(86) PCT No.: PCT/GB96/02155
§ 371 Date: Oct. 10, 1998
§ 102(e) Date: Oct. 10, 1998
(87) PCT Pub. No.: WO97/09862
PCT Pub. Date: Mar. 13, 1997

Related U.S. Application Data

(63) Continuation-in-part of application No. 08/707,012, filed on Sep. 3, 1996.

(30) Foreign Application Priority Data

Sep. 2, 1995 (GB) .................................. 9517918
Oct. 31, 1995 (GB) .................................. 9522281
Mar. 30, 1996 (GB) .................................. 9606836

(51) Int. Cl.$^7$ .................................................. H04R 25/00
(52) U.S. Cl. .......................... 381/152; 381/173; 381/361; 381/431
(58) Field of Search .................................. 381/152, 354, 381/355, 361, 365, 173, 190, 398, 396, FOR 146, 423, 425, 431

(56) References Cited

U.S. PATENT DOCUMENTS 3,347,335 * 10/1967 Watters et al. ........................ 381/354
4,700,396 * 10/1987 Bolin .................................... 381/152

* cited by examiner

*Primary Examiner*—Huyen Le
(74) *Attorney, Agent, or Firm*—Foley & Lardner

(57) ABSTRACT

A panel-form microphone characterised by a distributed mode acoustic member (12) and a transducer (63) coupled wholly and exclusively to the member to produce a signal in response to resonance of the member due to incident acoustic energy.

5 Claims, 4 Drawing Sheets

PANEL-FORM MICROPHONES

This application is a 371 of PCT/GB96/02155 filed Sep. 2, 1996 and is a continuation-in-part of application Ser. No. 08/707,012, filed Sep. 3, 1996.

TECHNICAL FIELD

The invention relates to microphones and more particularly to microphones comprising panel-form acoustic elements.

BACKGROUND ART

It is known from GB-A-2262861 to suggest a panel-form loudspeaker comprising:

a resonant multi-mode radiator element being a unitary sandwich panel formed of two skins of material with a spacing core of transverse cellular construction, wherein the panel is such as to have ratio of bending stiffness (B), in all orientations, to the cube power of panel mass per unit surface area ($\mu$) of at least 10;

a mounting means which supports the panel or attaches to it a supporting body, in a free undamped manner;

and an electro-mechanical drive means coupled to the panel which serves to excite a multi-modal resonance in the radiator panel in response to an electrical input within a working frequency band for the loudspeaker.

DISCLOSURE OF INVENTION

Embodiments of the present invention use members of nature, structure and configuration achievable generally and/or specifically by implementing teachings of our co-pending parent application Ser. No. 08/707,012. Such members thus have capability to sustain and propagate input vibrational energy by bending waves in operative area(s) extending transversely of thickness often but not necessarily to edges of the member(s); are configured with or without anisotropy of bending stiffness to have resonant mode vibration components distributed over said area(s) beneficially for acoustic coupling with ambient air; and have predetermined preferential locations or sites within said area for transducer means, particularly operationally active or moving part(s) thereof effective in relation to acoustic vibrational activity in said area(s) and signals, usually electrical, corresponding to acoustic content of such vibrational activity. Uses are envisaged in co-pending parent application Ser. No. 08/707,012, for such members as or in "passive" acoustic devices without transducer means, such as for reverberation or for acoustic filtering or for acoustically "voicing" a space or room; and as or in "active" acoustic devices with transducer means, such as in a remarkably wide range of sources of sound or loudspeakers when supplied with input signals to be converted to said sound, or in such as microphones when exposed to sound to be converted into other signals.

This invention is particularly concerned with active acoustic devices in the form of microphones.

Members as above are herein called distributed mode acoustic radiators and are intended to be characterised as in the above parent application and/or otherwise as specifically provided herein.

The invention is a panel-form microphone characterised by a stiff lightweight member having capability to sustain and propagate input vibrational energy by bending waves in at least one operative area extending transversely of thickness to have resonant mode vibration components distributed over said at least one area and have predetermined preferential locations or sites within said area for transducer means and having a transducer mounted wholly and exclusively on said member at one of said locations or sites to produce a signal in response to resonance of the member due to incident acoustic energy. The member may be mounted in a surrounding frame by means of an interposed resilient support. Two or more of the said transducers may be positioned at the locations or sites on the member. The member may have a cellular core sandwiched between skins. The or each transducer may be a piezo-electric device.

BRIEF DESCRIPTION OF DRAWINGS

The invention is diagrammatically illustrated, by way of example, in the accompanying drawings, in which.

BEST MODES FOR CARRYING OUT THE INVENTION

Figure 1:
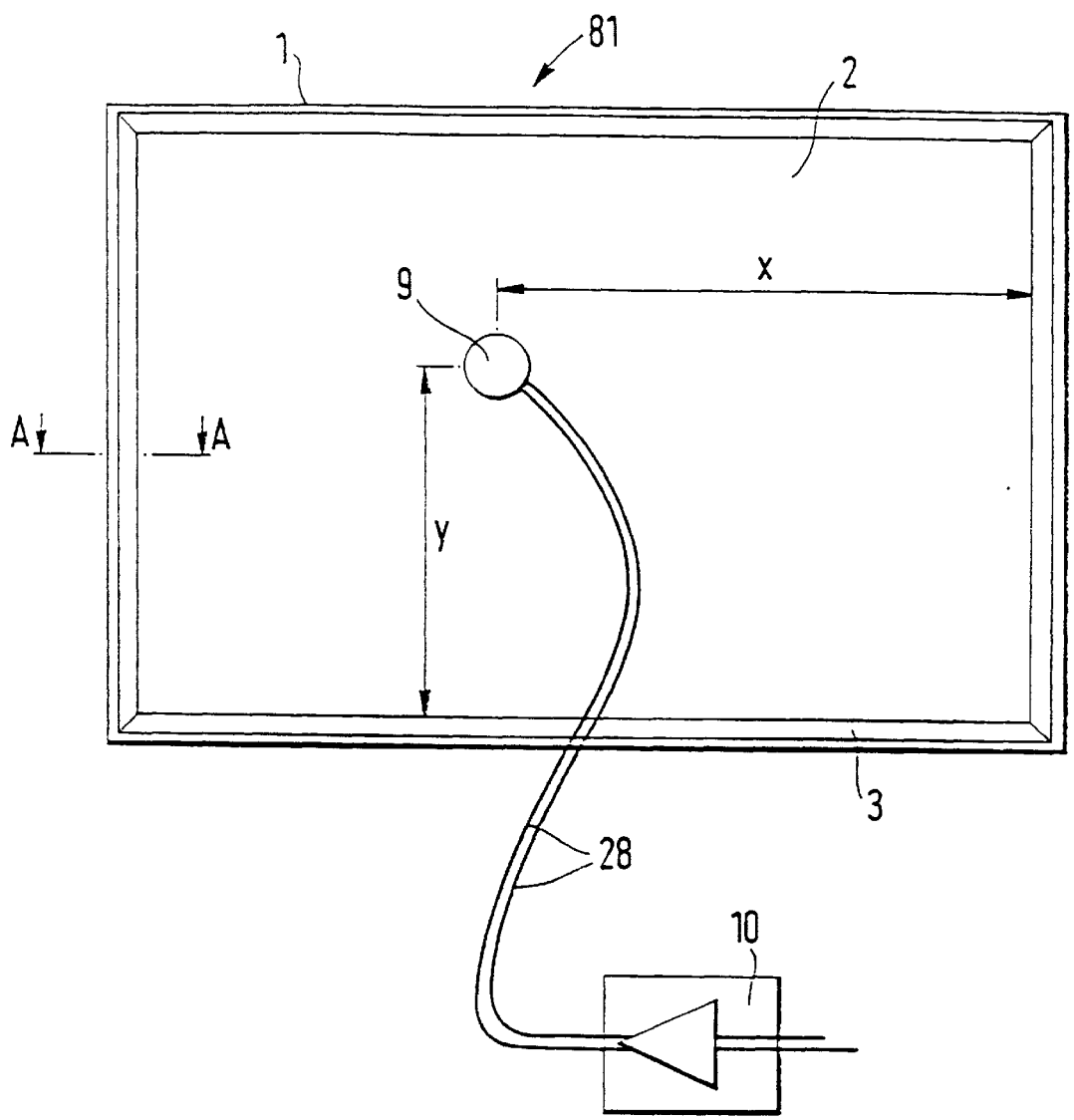
FIG. 1 is a diagram showing a distributed-mode loudspeaker as described and claimed in our co-pending parent application Ser. No. 08/707,012.

Referring to FIG. 1 of the drawings, there is shown a panel-form loudspeaker (81) of the kind described and claimed in our co-pending parent application Ser. No. 08/707,012, comprising a rectangular frame (1) carrying a resilient suspension (3) round its inner periphery which supports a distributed mode sound radiating panel (2). A transducer (9) as described in detail with reference to our co-pending application Ser. Nos. 09/011,773, 09/011,770, and 09/011,831, is mounted wholly and exclusively on or in the panel (2) at a predetermined location defined by dimensions x and y, the position of which location is calculated as described in our co-pending parent application Ser. No. 08/707,012, to launch bending waves into the panel to cause the panel to resonate to radiate an acoustic output. The transducer (9) is driven by a signal amplifier (10), e.g. an audio amplifier, connected to the transducer by conductors (28).

Amplifier loading and power requirements can be entirely normal, similar to conventional cone type speakers, sensitivity being of the order of 86–88 dB/watt under room loaded conditions. Amplifier load impedance is largely resistive at 6 ohms, power handling 20–80 watts. Where the panel core and/or skins are of metal, they may be made to act as a heat sink for the transducer to remove heat from the motor coil of the transducer and thus improve power handling.

Figure 2A:
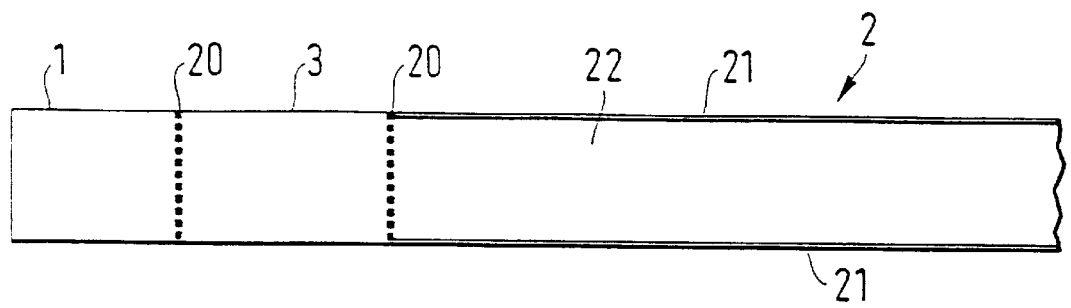
FIG. 2a is a partial section on the line A—A of FIG. 1.
Figure 2B:
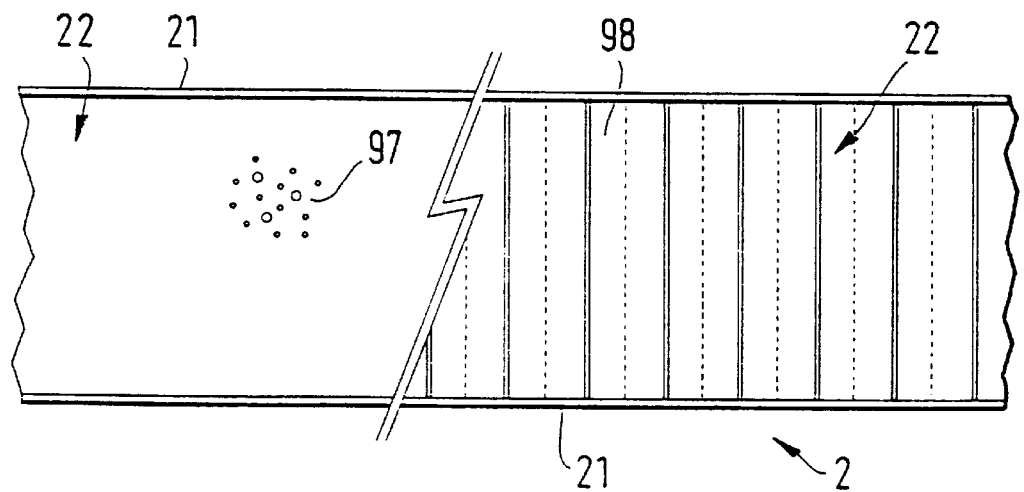
FIG. 2b is an enlarged cross-section through a distributed mode radiator of the kind shown in FIG. 2a and showing two alternative constructions.

FIGS. 2a and 2b are partial typical cross-sections through the loudspeaker (81) of FIG. 1. FIG. 2a shows that the frame (1), surround (3) and panel (2) are connected together by respective adhesive-bonded joints (20). Suitable materials for the frame include lightweight framing, e.g. picture framing of extruded metal e.g. aluminium alloy or plastics. Suitable surround materials include resilient materials such as foam rubber and foam plastics. Suitable adhesives for the joints (20) include epoxy, acrylic and cyano-acrylate etc. adhesives.

FIG. 2b illustrates, to an enlarged scale, that the panel (2) is a rigid lightweight panel having a core (22) e.g. of a rigid plastics foam (97) e.g. cross linked polyvinylchloride or a cellular matrix (98) i.e. a honeycomb matrix of metal foil, plastics or the like, with the cells extending transversely to the plane of the panel, and enclosed by opposed skins (21) e.g. of paper, card, plastics or metal foil or sheet. Where the skins are of plastics, they may be reinforced with fibres e.g. of carbon, glass, Kevlar or the like in a manner known per se to increase their modulus.

Envisaged skin layer materials and reinforcements thus include carbon, glass, Kevlar (RTM), Nomex (RTM) i.e. aramid etc. fibres in various lays and weaves, as well as paper, bonded paper laminates, melamine, and various synthetic plastics films of high modulus, such as Mylar (RTM), Kaptan (RTM), polycarbonate, phenolic, polyester or related plastics, and fibre reinforced plastics, etc. and metal sheet or foil. Investigation of the Vectra grade of liquid crystal polymer thermoplastics shows that they may be useful for the injection moulding of ultra thin skins or shells of smaller size, say up to around 30 cm diameter. This material self forms an orientated crystal structure in the direction of injection, a preferred orientation for the good propagation of treble energy from the driving point to the panel perimeter.

Additional such moulding For this and other thermoplastics allows for the mould tooling to carry location and registration features such as grooves or rings for the accurate location of transducer parts e.g. the motor coil, and the magnet suspension. Additionally wish some weaker core materials it is calculated that it would be advantageous to increase the skin thickness locally e.g. in an area or annulus up to 150% of the transducer diameter, to reinforce that area and beneficially couple vibration energy into the panel. High frequency response will be improved with the softer foam materials by this means.

Envisaged core layer materials include fabricated honeycombs or corrugations of aluminium alloy sheet or foil, or Kevlar (RTM), Nomex (RTM), plain or bonded papers, and various synthetic plastics films, as well as expanded or foamed plastics or pulp materials, even aerogel metals if of suitably low density. Some suitable core layer materials effectively exhibit usable self-skinning in their manufacture and/or otherwise have enough inherent stiffness for use without lamination between skin layers. A high performance cellular core material is known under the trade name 'Rohacell' which may be suitable as a radiator panel and which is without skins. In practical terms, the aim is for an overall lightness and stiffness suited to a particular purpose, specifically including optimising contributions from core and skin layers and transitions between them.

Several of the preferred formulations for the panel employ metal and metal alloy skins, or alternatively a carbon fibre reinforcement. Both of these, and also designs with an alloy Aerogel or metal honeycomb core, will have substantial radio frequency screening properties which should be important in several EMC applications. Conventional panel or cone type speakers have no inherent EMC screening capability.

In addition the preferred form of piezo and electro dynamic transducers have negligible electromagnetic radiation or stray magnetic fields. Conventional speakers have a large magnetic field, up to 1 metre distant unless specific compensation counter measures are taken.

Where it is important to maintain the screening in an application, electrical connection can be made to the conductive parts of an appropriate DML panel or an electrically conductive foam or similar interface may be used for the edge mounting.

The suspension (3) may damp the edges of the panel (2) to prevent excessive edge movement of the panel. Additionally or alternatively, further damping may be applied, e.g. as patches, bonded to the panel in selected positions to damp excessive movement to distribute resonance equally over the panel. The patches may be of bitumen-based material, as commonly used in conventional loudspeaker enclosures or may be of a resilient or rigid polymeric sheet material. Some materials, notably paper and card, and some cores may be self-damping. Where desired, the damping may be increased in the construction of the panels by employing resiliently setting, rather than rigid setting adhesives.

Effective said selective damping includes specific application to the panel including its sheet material of means permanently associated therewith. Edges and corners can be particularly significant for dominant and less dispersed low frequency vibration modes of panels hereof. Edge-wise Fixing of damping means can usefully lead to a panel with its said sheet material fully framed, though their corners can often be relatively free, say for desired extension to lower frequency operation. Attachment can be by adhesive or self-adhesive materials. Other forms of useful damping, particularly in terms of more subtle effects and/or mid- and higher frequencies can be by way of suitable mass or masses affixed to the sheet material at predetermined effective medial localised positions of said area.

A panel as described above is a good receiver of sound which appears as acoustic vibration over the panel. A preferably lightweight panel structure aids sensitivity and the vibration may be sensed by one and preferably more simple bending transducers e.g. of the piezo variety as described in FIG. 4 below. A plurality of transducers and transducer placement positions optimises the quality of coupling from the distributed panel vibrations to the desired electrical output signal. Placement should be in position(s) of high modal density, inboard of the panel, while the panel itself should have the preferred actual or equivalent geometry for good modal distribution.

Sound energy incident on the panel is converted into free mode vibration. This vibration may be sensed by optical or electrodynamic vibration transducers and the result is a microphone. For non-critical applications a single sensor is effective, placed at an equivalent, optimised driving point.

For superior quality the non reciprocal nature of the transduction principle must be considered. Two factors are pertinent; firstly, some frequency dependent equalisation to reach a flat frequency response, and secondly, the need to capture a broader sampling of the complex vibrations of the acoustic panel. A minimum of three transducers is indicated; they may be inexpensive piezo electric benders with their outputs connected in parallel. Alternatively larger area polymer piezo films may be applied, with suitable geometric pickup patterning to define the vibration integration areas for the required optimisation of sensitivity versus frequency response.

Figure 3:
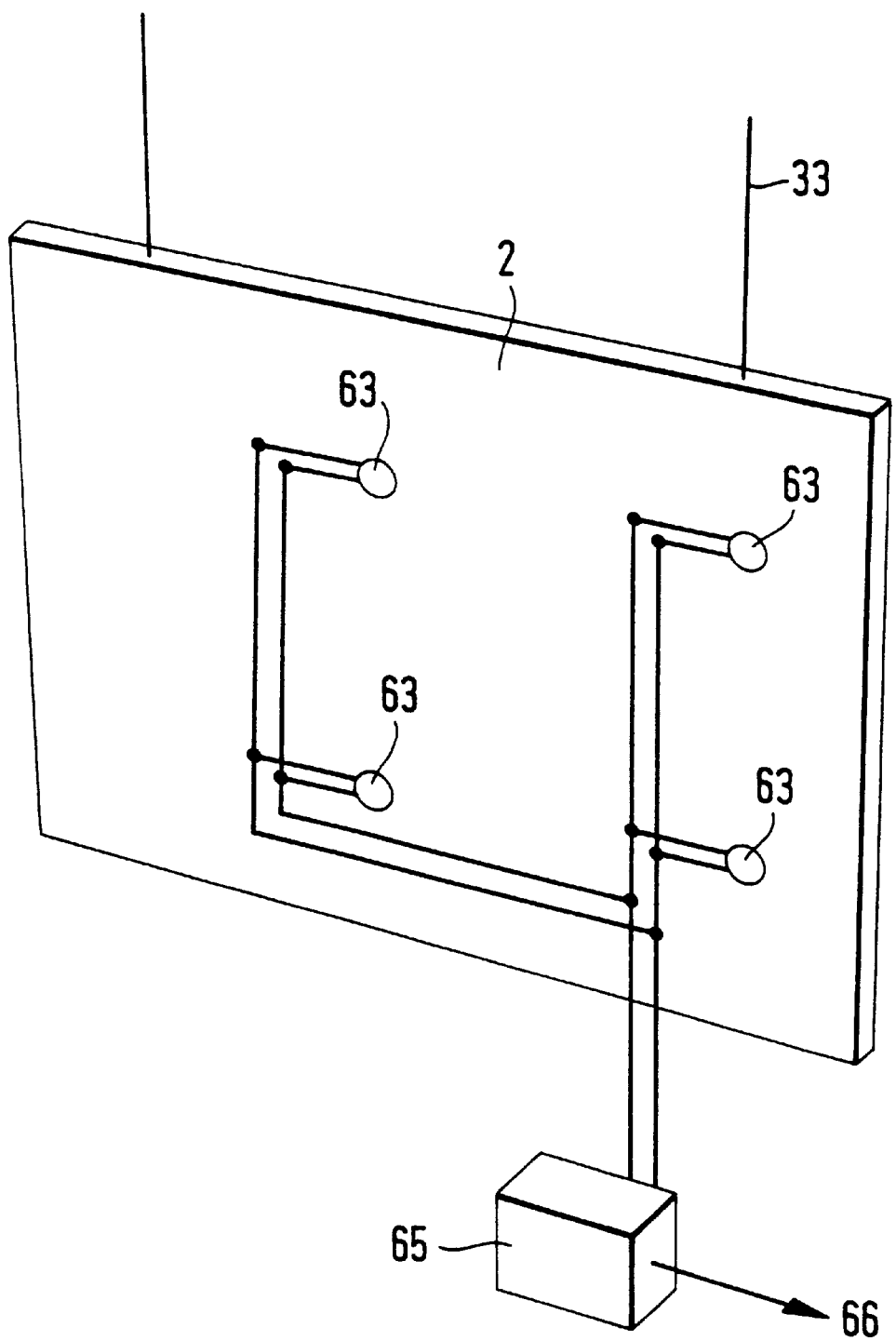
FIG. 3 is a diagram of an embodiment of distributed-mode microphone according to the present invention.

For microphone applications it is advantageous that the panel be light to provide the best match between the radiation impedance of the air and the panel. Higher sensitivity is achieved with lower mass panels. For a single transducer the calculations for the theoretical model indicates an optimal location at a panel corner since all vibrational modes are 'voiced' at the corners. FIG. 3 illustrates a distributed mode panel (2) according to the present invention e.g. of the kind shown in FIGS. 1 and 2, intended for use as a sound receiver or microphone. Although not shown in the drawing, the panel (2) is mounted in a surrounding frame (1) and is attached to the frame via a resilient suspension (3) in the manner shown in FIGS. 1 and 2. The frame is suspended on a pair of wires (33), e.g. from a ceiling or on a floor standing frame (not shown).

The panel carries an array of four vibration transducers (63) spaced over the panel and which may be piezo-electric transducers of the kind shown in FIG. 4 below which are coupled in parallel to drive a signal receiver and conditioner (65) connected to an output (66).

Figure 4:
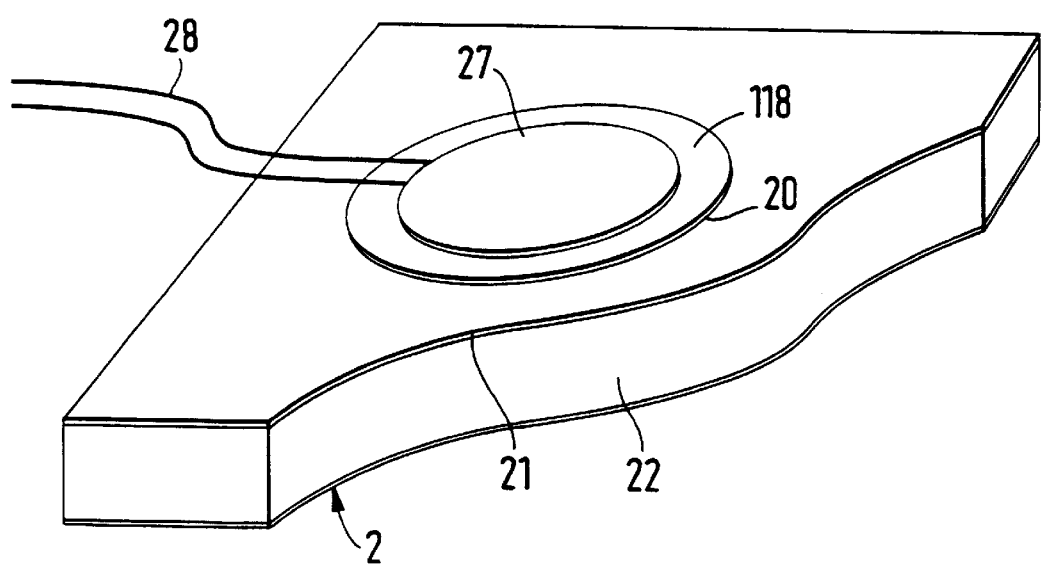
FIG. 4 is a perspective view of a vibration transducer.

FIG. 4 shows a transducer (9) for a distributed mode panel (2) in the form of a crystalline disc-like piezo bender (27) mounted on a disc (118), e.g. of brass, which is bonded to a face of the panel (2), e.g. by an adhesive bond (20). In operation an acoustic signal applied to the transducer (9) via leads (28) will cause the piezo disc (27) to bend and thus locally resiliently deform the panel (2) to launch bending waves into the panel.

What is claimed is:

1. A panel-form microphone for operation in a predetermined frequency range, comprising:

a member having selected values of certain physical parameters which enable the member to sustain and propagate input vibrational energy in a predetermined frequency range by a plurality of resonant bending wave modes in at least one operative area extending transversely of thickness such that the frequencies of the resonant bending wave modes along at least two conceptual axes of the operative area are interleaved and spread so that there are substantially minimal clusterings and disparities of spacings of said frequencies, the member when resonating having at least one site at which the number of vibrationally active resonance anti-nodes is relatively high; and a transducer coupled to the member at one of said sites on the member, the transducer being capable of converting resonance vibrations of the member due to incident acoustic energy in the predetermined frequency range into an electrical output signal.

2. A panel-form microphone according to claim 1, comprising the member (2) is mounted in a surrounding frame (1) by means of an interposed resilient support (3).

3. A panel-form microphone according to claim 1, wherein at least two said transducers (9,63) at said sites on the member.

4. A panel-form microphone according to claim 1, wherein the member (2) has a cellular core (22) sandwiched between skins (21).

5. A panel-form microphone according to claim 1, wherein the or each transducer (9,63) is a piezo-electric device.

* * * * *